United States Patent
Pauli

(10) Patent No.: US 9,031,735 B2
(45) Date of Patent: May 12, 2015

(54) TAMPERING DETECTION METHOD

(75) Inventor: Joakim Pauli, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 167 days.

(21) Appl. No.: 13/392,787

(22) PCT Filed: Aug. 28, 2009

(86) PCT No.: PCT/SE2009/000394
§ 371 (c)(1), (2), (4) Date: Mar. 20, 2012

(87) PCT Pub. No.: WO2011/025416
PCT Pub. Date: Mar. 3, 2011

(65) Prior Publication Data
US 2012/0245788 A1 Sep. 27, 2012

(51) Int. Cl.
*B60W 50/04* (2006.01)
*F02D 41/22* (2006.01)
*G06F 21/64* (2013.01)
*F02D 41/24* (2006.01)
(Continued)

(52) U.S. Cl.
CPC ............... *F02D 41/22* (2013.01); *G06F 21/64* (2013.01); *G05B 2219/24042* (2013.01); *B60W 50/045* (2013.01); *F02D 41/2487* (2013.01); *F02D 41/2425* (2013.01); *F02D 41/28* (2013.01); *G06F 21/572* (2013.01); *Y02T 10/40* (2013.01)

(58) Field of Classification Search
CPC ..... F02D 41/2487; F02D 41/22; G06F 21/64; G05B 2219/24042; B60W 2050/041; B60W 2050/043; B60W 50/045

USPC ............ 701/29.1, 29.6, 32.6, 33.4, 34.2, 102, 701/34.6
See application file for complete search history.

(56) References Cited

U.S. PATENT DOCUMENTS 5,797,107 A * 8/1998 Berg et al. ..................... 701/32.3
6,219,696 B1 4/2001 Wynblatt et al.
(Continued)

FOREIGN PATENT DOCUMENTS

| FR | 2719919 A1 * | 11/1995 | ............. G05B 15/02 |
| JP | 2005339228 A * | 12/2005 | ................ G06F 1/00 |
| WO | 2006063919 A2 | 6/2006 | |

OTHER PUBLICATIONS

EFILive.Com Forum Post, "LMM Programming History & CVN's Explained" by Ross (GMPX), Jul. 2, 2008, 28 pages, downloaded from http://forum.efilive.com/archive/index.php/t-8471.html.*
(Continued)

*Primary Examiner* — Behrang Badii
*Assistant Examiner* — David Testardi
(74) *Attorney, Agent, or Firm* — WRB-IP LLP

(57) ABSTRACT

A method is provided for detecting use of unauthorized software in an engine control unit provided in a vehicle. The method includes calculating a Checksum Verification Number (CVN) each time the engine is started, comparing a last calculated CVN with a last stored CVN in a list of a plurality of CVN entries, storing the last calculated CVN if the last calculated CVN is different to the last stored CVN together with a date of an entry in the list of CVN and/or the current odometer status, removing entries in the list of CVN according to FIFO principle when the list of CVN is full, and presenting this upon request from an on-board or off-board tool.

5 Claims, 2 Drawing Sheets

| # | Checksum | Date | Odo |
|---|---|---|---|
| 1 | D253 | 2009-06-11 | 8340 |
| 2 | 9347 | 2009-06-14 | 8340 |
| . | . | . | . |
| n | xxxx | xxxx | xxxx |

(51) Int. Cl.
*F02D 41/28* (2006.01)
*G06F 21/57* (2013.01)

(56) References Cited

U.S. PATENT DOCUMENTS

| | | | | |
|---|---|---|---|---|
| 6,678,606 | B2* | 1/2004 | Akins et al. | 701/114 |
| 7,406,717 | B2* | 7/2008 | Tenbusch | 726/28 |
| 7,433,953 | B1 | 10/2008 | Kappler et al. | |
| 7,894,978 | B2* | 2/2011 | Kurnik et al. | 701/115 |
| 8,135,533 | B2* | 3/2012 | Noda | 701/102 |
| 8,600,605 | B2* | 12/2013 | Grenn et al. | 701/29.1 |
| 2003/0037256 | A1 | 2/2003 | Kawamura | |
| 2003/0055552 | A1 | 3/2003 | Akins et al. | |
| 2005/0034034 | A1* | 2/2005 | Kamada | 714/52 |
| 2005/0165760 | A1* | 7/2005 | Seo | 707/3 |
| 2009/0150118 | A1* | 6/2009 | Naima | 702/165 |
| 2009/0210613 | A1* | 8/2009 | Mueller et al. | 711/103 |
| 2010/0094780 | A1* | 4/2010 | Trzcinski | 705/417 |

OTHER PUBLICATIONS

Rodriguez, Jon, "Maintaining the . . . Computer'?", Gears, Aug. 2008, pp. 20-27.*

Final Regulation Order: Title 13, California Code Regulations, Section 1968.2 (Malfunction and Diagnostic System Requirements for 2004 and Subsequent Model-Year Passenger Cars, Light-Duty Trucks, and Medium-Duty Vehicles and Engines (OBD II), 2003, 81 pages.*

Informal ISO document GRPE-52-12, draft document of ISO/PDPAS 27145-1.4, published Jun. 6-9, 2006, 211 pages, downloaded from http://www.unece.org/fileadmin/DAM/trans/doc/2006/wp29grpe/ECE-TRANS-WP29-GRPE-52-inf12e.pdf.*

International Search Report for corresponding nternational application No. PCT/SE2009/000394, (Dec. 2, 2011).

\* cited by examiner

| # | Checksum | Date | Odo |
|---|----------|------|-----|
| 1 | D253 | 2009-06-11 | 8340 |
| 2 | 9347 | 2009-06-14 | 8340 |
| . | . | . | . |
| n | xxxx | xxxx | xxxx |

TAMPERING DETECTION METHOD

BACKGROUND AND SUMMARY

The invention relates to a software detection method according to the preambles of the independent claims.

An electronic control device for e.g. an internal combustion engine or a gearbox contains software for controlling different applications of said engine or gearbox.

When an engine and gearbox is leaving the factory it has a predetermined version of the software installed. Said software may later on be upgraded by the manufacturer of the vehicle at for instance service points of the vehicle for certain reasons.

However, there are also a number of more or less irresponsible tuning firms which provide for numerous variants of software tuning installations. Such unauthorised software may cause premature component wear due to manipulations of originally defined system variables such as inter alia variables for controlling, injection timing, fuel amount injected to each cylinder, boost pressure, rpm limit and manipulation of the gear shift program. Such installations of unauthorized software may case the engine and/or gear box to present premature engine and/or gearbox failure and/or noticeable wear of such components which is a problem for the manufacturer and its guarantee commitment. When there is a mechanical failure due to the use of unauthorized software the owner of the vehicle usually install the original software for hiding the use of the tuning software which may have been the cause of such mechanical failure.

It is desirable to provide a method for detecting the use of unauthorized software use in an electronic control unit e.g. for an internal combustion engine and/or vehicle gearbox for making it possible for the vehicle manufacturer to prove non approved software installations.

In a first example embodiment according to an aspect of the invention a method is provided for detecting use of unauthorized software in an electronic control unit provided in a vehicle, said method comprising the steps of calculating CVN each time the engine is started, comparing a last calculated CVN with a last stored CVN in a list comprising a plurality of storage places for said CVN, storing said last calculated CVN if said last calculated CVN is different to the last stored CVN together with a date of an entry in said list of CVN and/or the current odometer status, removing entries in the list of CVN according to FIFO principle when said list of CVN is full.

An advantage with said example embodiment of the present invention is that vehicle manufacturer may control and/or detect unauthorized software in an easy and inexpensive manner.

In another example embodiment according to an aspect of the present invention said list of CVN entries comprises at least 10 storage positions.

An advantage with said example embodiment of the present invention is that the use of unauthorized software is more difficult to erase the more storage positions there is, i.e., a user must upload a number of different versions of software in order to erase the unauthorized software.

In another example embodiment of an aspect of the present invention said method further comprises the step of providing a separate list of CVN for different predefined parts of the software application.

An advantage of having different list of CVN for different parts of the software application may be that the manufacturer can detect more accurately where in the software there has been a change and if said change is authorized or not.

In another example embodiment of the present invention said method further comprises the step of restricting said CVN calculation to a maximum of one time per day.

An advantage of said example embodiment may be that it is more difficult to erase the trace of an unauthorized software since it will take several days or several weeks depending on the number of storage positions.

In another example of an embodiment of the present invention, said method further comprises the step of retrieving a list of CVNs with metadata (e.g. Odometer, date, time) for an on-board or off-board client utilizing e.g. a diagnostic communication protocol.

An advantage of said example embodiment of the present invention is that said list of CVN numbers may be easily detectable and easily visualized.

DESCRIPTION OF THE DRAWINGS

The present invention together with the above-mentioned and other objects and advantages may best be understood from the following detailed description of the embodiments, but not restricted to the embodiments, wherein is shown schematically.

CVN is an abbreviation for Checksum Verification Number. The term CVN is used for all types of checksums in the document and is not limited to the engine electronic control unit.

Figure 1:
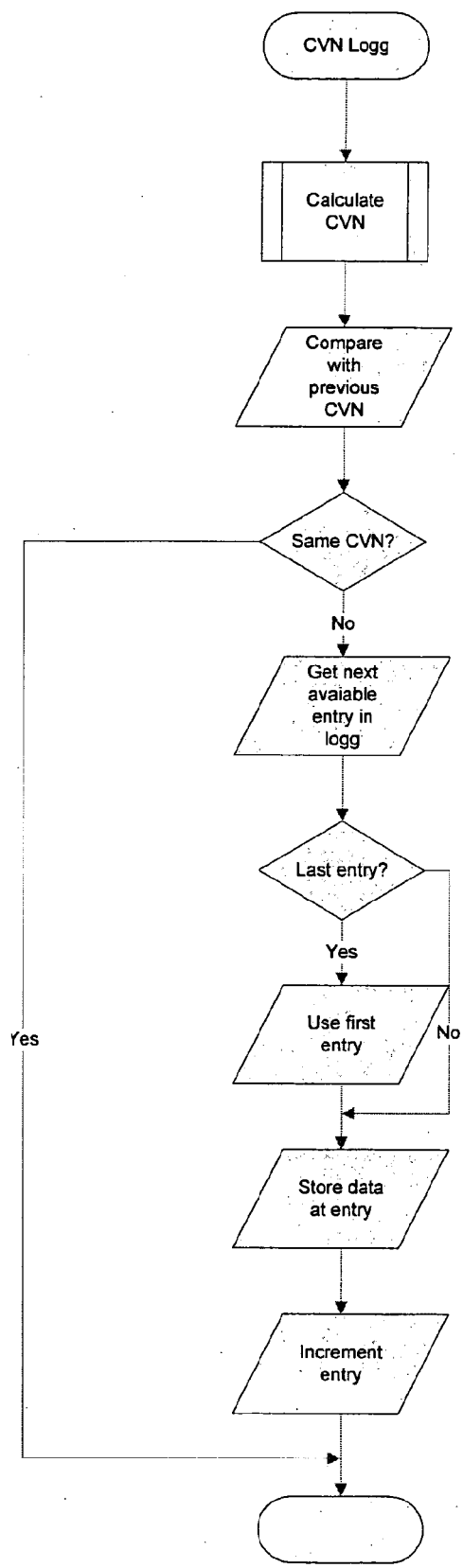
FIG. 1 depicts an example embodiment of a flowchart for entering a CVN into a CVN log according to the present invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

Figures 2, 3:
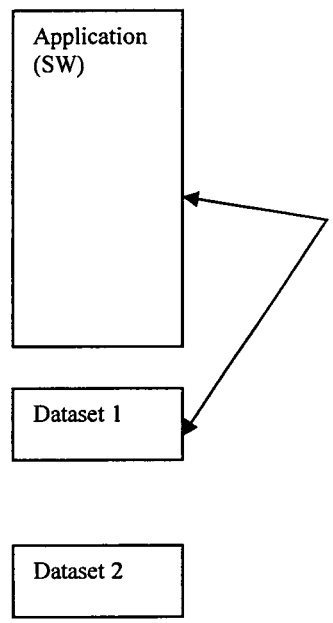
FIG. 2 depicts an example embodiment of a software build up.
FIG. 3 depicts an example embodiment of a CVN log.

FIG. 1 depicts an example embodiment of a flowchart for entering CVN (Calibration Verification Number) into a CVN log according to the present invention. The CVN log comprises a plurality of storage positions. FIG. 3 illustrates an example embodiment of a CVN log. A first column relates to the storage event number and is denoted by #. A second column relates to the checksum and is denoted by Checksum. A third column relates to the date of the storage event and is denoted by Date. A fourth column is relating to the odometer status and is denoted by Odo. Each storage position comprises therefore possible indication of the storage event number, checksum, date and odometer position. Alternatively, there may also further information stored at each event such as a signature of a person who made a software upgrade/amendment. There is also a use case to track the software updates made at the service station with an authorized tool. Sometimes the technician make an incorrect software update and the invention can be used for tracking those update and update the service methods.

The calculation of said CVN may be performed each time a vehicle is started. Alternatively said calculation of CVN is performed at a maximum of one time a day. Making a restriction of CVN calculation of only one time per day may make it more difficult to clean a list of CVN for a vehicle owner who has used unauthorized software since cleaning one entry takes one day and x entries takes x days.

The calculated CVN is compared with the latest stored CVN in the CVN log. When a brand new vehicle leaves a factory there is at least one CVN entry in said CVN log. If the newly calculated CVN is equal to said latest stored CVN in the list no entry is made in the CVN log denoted by the yes trail from "same CVN?" box in the flow chart depicted in FIG. 1.

If the newly calculated CVN is different to said latest stored CVN in the list an entry is made in the CVN log denoted by the no trail from "same CVN?" box in the flow chart depicted in FIG. 1. If there is a free available storage place after the latest CVN in the CVN log said newly calculated CVN is stored on said place. If all available storage places in the CVN log are full a FIFO (first in first out) principle is used to remove the oldest stored CVN and store the newly calculated CVN in the list after the last stored CVN.

FIG. 2 illustrates an example embodiment of a software build up. Said software ma comprise an application part, a dataset 1 part and a dataset 2 part. The application part of the software may comprise functionality for managing the main functionality (i.e. the programme). The dataset 1 part may comprise the calibration for the functionality for managing the emissions from the vehicle. Such functionality may be management of exhaust gas after treatment system, injection timing, injection amount, rpm limits, gear change positions etc. Dataset 2 may comprise the calibration for functionality which is unique for the vehicle such as injector codes or customer parameters. The software in said application part and/or said dataset part may have its own CVN log, i.e., the application part of the software may have a first CVN log and the dataset part may have a second CVN log. There is also a possibility to use a single CVN log for both said pans of the software.

The CVN log can be extracted (read) by an on-board or off-board client utilizing e.g. a diagnostic communication protocol, e.g., SAE J1939-73, ISO 15765-3.

The invention claimed is:

1. A method for operating a vehicle having at least one of an engine and a gearbox, comprising:
   accessing a list of Checksum Verification Numbers (CVN) comprising storage positions;
   controlling operation of the at least one of the engine and the gearbox via software in an electronic control unit; and
   detecting use of unauthorized software in the electronic control unit by performing the following steps each time the engine is started or once a day:
      calculating, via the electronic control unit, a CVN based on data bytes in an area of interest of the software, and
      comparing a last calculated CVN with a last stored CVN in the list of CVNs,
   wherein the method further comprises:
   removing entries from the list of CVNs according to a FIFO principle in response to a determination that the list of CVNs is full and in response to a determination that the last calculated CVN is different from the last stored CVN, and
   storing the last calculated CVN together with a current odometer status as entries in the list of CVNs, in response to a determination that the last calculated CVN is different from the last stored CVN.

2. The method according to claim 1, wherein the list of CVNs comprises at least 10 storage positions.

3. The method according to claim 1, wherein the method further comprises providing a separate list of CVNs for different predefined parts of the software.

4. The method according to claim 1, wherein the method further comprises restricting CVN calculation to a maximum of one time per day.

5. The method according to claim 1, wherein the method further comprises retrieving the list of CVNs with metadata for an on-board or off-board client utilizing a diagnostic communication protocol.

* * * * *